Nov. 15, 1966 W. C. WRIGHT 3,285,220
WATER VEHICLE
Filed June 28, 1965
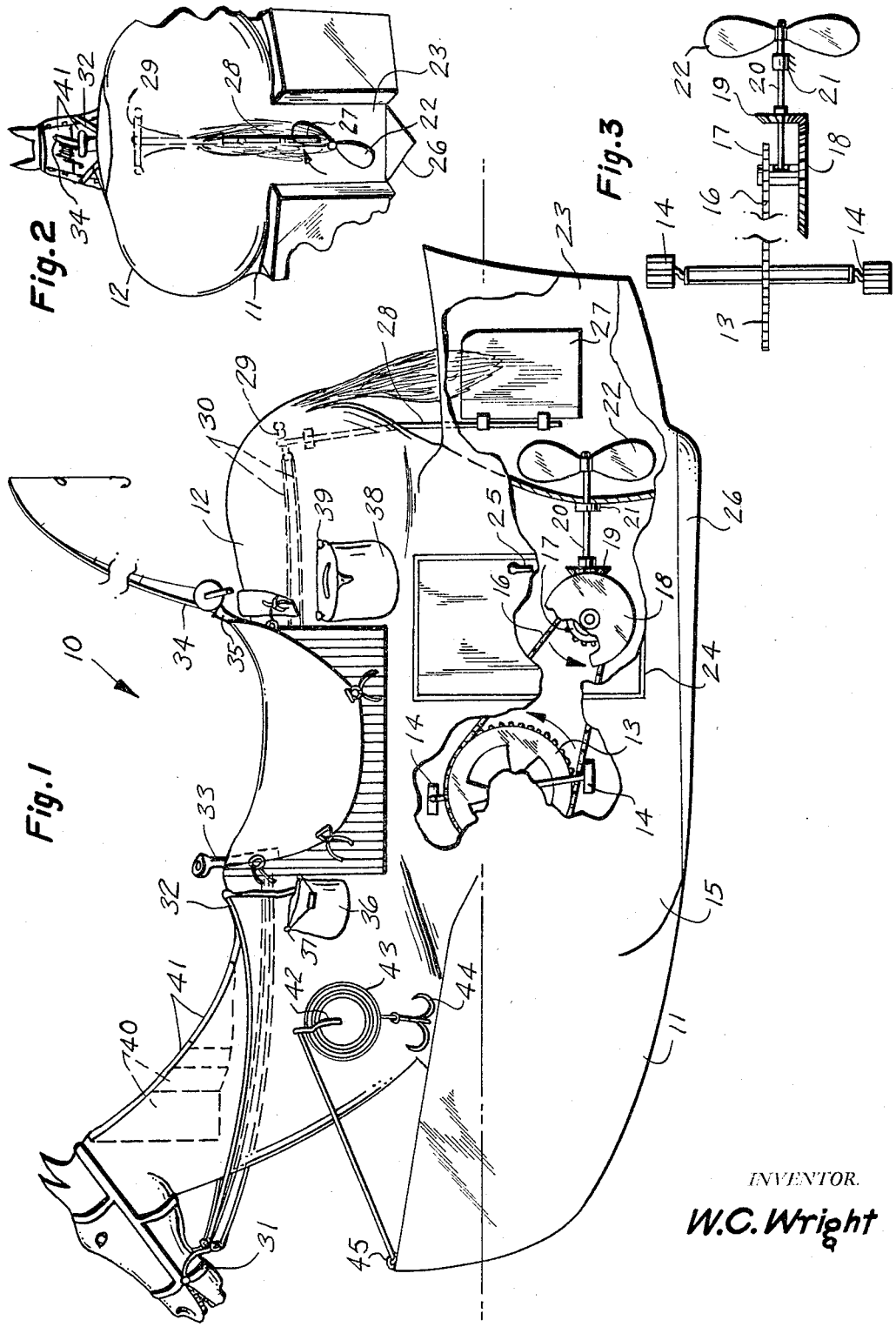
INVENTOR.
W.C. Wright

United States Patent Office 3,285,220
Patented Nov. 15, 1966

3,285,220
WATER VEHICLE
William Clyde Wright, P.O. Box 586, Robertsdale, Ala.
Filed June 28, 1965, Ser. No. 467,306
2 Claims. (Cl. 115—25)

This invention relates to manually driven vehicles, and more particularly to an animated water vehicle.

It is therefore the main purpose of this invention to provide a water vehicle which will be used in bathing pools, quiet lakes and placid streams and when in use will appear that the rider is riding a live horse in the water.

Another object of this invention is to provide a water vehicle which will have sprocket drive means coupled to a propeller shaft thus providing a means for propelling the vehicle in the water.

Another object of this invention is to provide a water vehicle which will have rear rudder means to steer it and the hollow horse shaped body of the device will have rein means secured to lines attached to the rudder which will allow steering by use of the reins.

Another object of this invention is to provide a water vehicle which will have storage compartments within the hollow body for storing fishing tackle and the like and will have hollow saddle horns which will receive the butt of the fishing rod and the vehicle will also have a line and anchor allowing it to remain stationary at any one point in a body of water.

Still another object of this invention is to provide a water vehicle which will be safe in operation and will have built in floatation means to prevent it from sinking and will be of such construction so as to prevent the rider from accidentally falling from the saddle attached to the vehicle.

Other objects and advantages of the invention will become apparent from a consideration of the following detailed description taken in connection with the accompanying drawing wherein a satisfactory embodiment of the invention is shown. However, it is to be understood that the invention is not limited to the details disclosed but includes all such variations and modifications as fall within the spirit of the invention and the scope of the appended claims.

In the drawing:

FIGURE 1 is a side view of this invention shown partly broken away.

FIGURE 2 is a fragmentary rear view of FIGURE 1 shown in elevation.

FIGURE 3 is a top plan view of the propelling mechanism shown removed from FIGURE 1.

According to this invention, a water vehicle 10 is provided with a hollow boat shaped hull 11, the upper extremity forming a horse shaped hollow body 12. A drive sprocket 13 within hull 11 is provided with foot pedals 14 in order to rotate sprocket 13 and the foot pedals 14 are received within the side cavity area 15 of hull 11. An endless chain 16 is received upon sprocket 13 and a driven sprocket 17 within hull 11 and sprocket 17 is secured to a bevel gear 18 which toothingly engages a similar bevel gear 19. A shaft 20 is secured within gear 19 and a bearing 21 receives shaft 20 and provides support for shaft 20. A propeller 22 is secured to the end of shaft 20 thus providing propulsion through the water when shaft 20 is rotated. Bearing 21 is secured in the rear of hull 11 and propeller 22 is free to rotate within the opening 23 of hull 11. A rectangular door 24 (with the hinges not shown) is provided with a handle 25 thus allowing access to the mechanical components of vehicle 10. The underside of hull 11 is provided with a tapered and triangular ballast 26 which provides a low center of gravity for vehicle 10 thus preventing it from tipping over and throwing its rider. A rudder 27 is received within opening 23 and is secured to a shaft 28 which extends into the hollow body 12 of vehicle 10. A cross-bar 29 secured to shaft 28 is provided with a line 30 secured to each end of bar 29 and the other ends of line 30 are secured to the harness 31 which is also secured to the reins 32 which provide for pivoting rudder 27 in order to steer vehicle 10 in the water. A hollow saddle horn 33 on the saddle area of body 12 of vehicle 10 slidably receives the butt of a fishing rod 34. Fishing rod 34 may be placed in the rear saddle horn 35 when trolling is desired. A bait bucket 36 is secured to rings 37 attached to the sides of hollow body 12 in front of the saddle area of the water vehicle 10 and a fish container 38 is suspended by means of rings 39 in the rear of the saddle area. A plurality of adjacent compartments 40 in the net area of body 12 are accessible to by a pair of hinged doors 41. A Z-shaped bar 42 secured to one side of hollow body 12 receives a looped line 43 to which is secured an anchor 44. The other end of line 43 is secured to eye 45 which is fixed to the bow of hull 11.

It will be noted that the reins 32 provide a means of causing the vehicle 10 to buck in the water when the rider shifts his weight and pulls upon reins 32 alternately with the motion of his body.

What I now claim is:

1. A hollow water vehicle comprising a hollow hull lower portion and an animated hollow upper body portion, a manually driven propelling mechanism carried within the vehicle, a pair of reins and lines providing steering means for the vehicle and hollow saddle horns providing holding means for a fishing rod, said hull having a tapered ballast along its central underside area, thus lowering the center of gravity of said vehicle to prevent it from tipping over and spilling its rider and the rudder of said vehicle is pivotable within an opening in the rear of the hull portion of said vehicle.

2. A water vehicle comprising a hollow hull lower portion, an animated hollow upper body portion, a manually driven propelling mechanism carried within the vehicle, a pair of reins and lines providing steering means for the vehicle, hollow saddle horns providing holding means for a fishing rod, a pair of spaced apart containers providing bait holding means and fish containing means for said vehicle, said hollow saddle horns comprising a front and rear saddle horn having a hollow center receiving the butt end of a fishing rod, anchor means for said vehicle comprising a Z-shaped bar secured to one side of said body of said vehicle with an anchor secured to one end of a line received upon said bar while the other end of said line is secured to an eye at the bow of said hull of said vehicle, said vehicle being recessed in the sides of said hull and hollow body allowing easy use of foot pedals which are secured to said drive sprocket which is suspended upon its shaft within said vehicle, said drive sprocket receiving a continuous chain which is also received around a driven sprocket rearward of said drive sprocket and a bevel gear secured to the shaft of said driven sprocket being toothingly engaged with a bevel gear secured to a propeller shaft.

References Cited by the Examiner
UNITED STATES PATENTS

| | | | |
|---|---|---|---|
| 1,718,637 | 6/1929 | De Pento | 272—1 |
| 2,960,058 | 11/1960 | Magnani | 115—25 |
| 2,991,076 | 7/1961 | Hale | 272—1 |

FERGUS S. MIDDLETON, *Primary Examiner.*
ANDREW H. FARRELL, *Examiner.*